United States Patent [19]

DeCoursey

[11] 4,243,930
[45] Jan. 6, 1981

[54] METHOD AND MEANS FOR TRANSMITTING LOW SPEED SIGNALS OVER A PCM FRAMING CODE

[75] Inventor: Calvin H. DeCoursey, Reno, Nev.

[73] Assignee: Lynch Communication Systems, Inc., Reno, Nev.

[21] Appl. No.: 41,865

[22] Filed: May 23, 1979

[51] Int. Cl.³ .............................................. H04J 1/14
[52] U.S. Cl. ................................................. 370/110
[58] Field of Search .................. 370/110, 111, 82, 84, 370/99

[56] References Cited

U.S. PATENT DOCUMENTS

| | | | |
|---|---|---|---|
| 3,840,705 | 10/1974 | Hackett | 370/110 |
| 3,873,776 | 3/1975 | Smith | 370/110 |
| 3,909,540 | 9/1975 | Maryscuk | 370/110 |
| 3,936,609 | 2/1976 | Waldeck | 370/110 |

Primary Examiner—David L. Stewart
Attorney, Agent, or Firm—Phillips, Moore, Weissenberger, Lempio & Majestic

[57] ABSTRACT

The standard D3 signalling frame bit pattern of a T1-type PCM telephone system is modified to provide a pattern in which (4n-3) separate low-speed data channels can be transmitted in a superframe consisting of 12n frames of the PCN carrier (n being a positive integer), without requiring a separate synchronization detector for superframe synchronization. Simple self-synchronizing circuit means are further disclosed for multiplexing a large number of essentially steady-state signals onto the low-speed data channels, and for positively detecting the onset and cessation of each steady-state signal, independently of the onset and cessation of any other steady-state signal, once in each group of k superframes, where k-1 is the number of steady-state signals being multiplexed.

6 Claims, 10 Drawing Figures

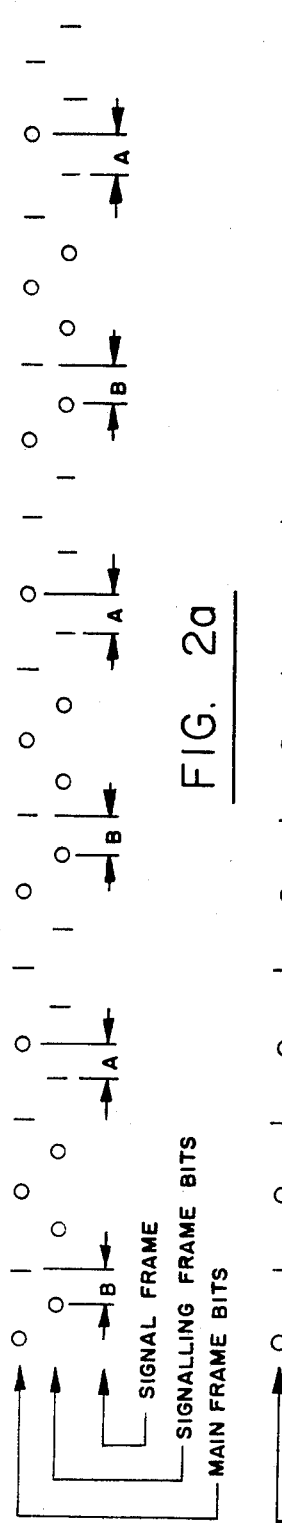
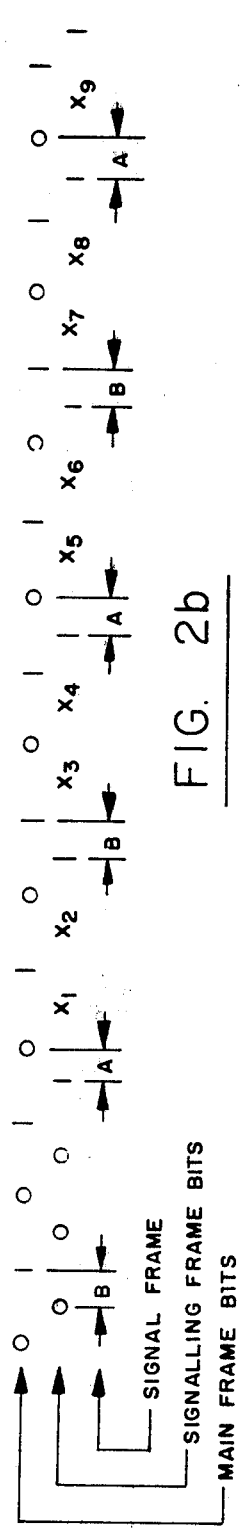
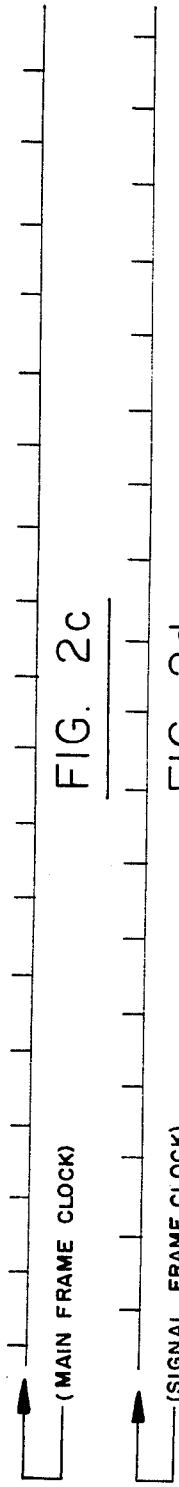
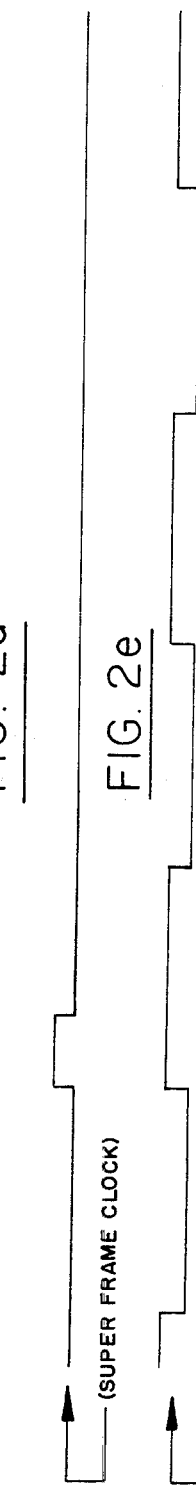
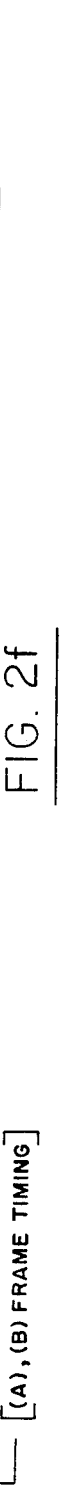

METHOD AND MEANS FOR TRANSMITTING LOW SPEED SIGNALS OVER A PCM FRAMING CODE

BACKGROUND OF THE INVENTION

The multiplexing of several telephone channels onto a single pulse-code modulated carrier is commonly carried out by a system standardized throughout the telephone industry and known as a T1-type system. D3 is the most commonly used T1-type system. In order to enable the receiving apparatus in such a system to properly synchronize itself with the incoming pulse train, D3 systems use a so-called D3 signal format, in which each one hundred ninety-two bit information segment of the pulse train is preceded by a framing pulse whose logic level is determined by an arbitrary standardized scheme.

Specifically, in the D3 format, the framing pulses alternate between main frame pulses whose sequence is 101010101010..., and signalling frame pulses whose sequence is 000111000111..., the initial "0" of the signalling frame pattern always following a "0" of the main frame pattern. It will be noted that the main frame pattern repeats every four frames, whereas the signalling frame pattern repeats every twelve frames.

On occasion, it is desirable to transmit over the T1-type carrier certain low-speed information such as equipment status or alarm information, without using one of the multiplexed channels for that purpose. U.S. Pat. No. 3,909,540 to Maryscuk et al shows one way of accomplishing this. Noting that the triple bits of the signalling frame pattern are redundant, and that 0x0x1x0x0x1x (where x can be either "1" or "0") is an equally distinctive pattern, Maryscuk derives the signalling frame synchronization from the 001 pattern of those signalling frame bits which immediately follow a "0" bit of the main frame pattern. This leaves every other signalling frame bit (i.e. the signalling frame bits immediately following the "1" bits of the main frame pattern) free for the transmission of low-speed information. The positions of these bits in the pattern are referred to herein as the "x" positions.

Inasmuch as the low-speed information must also be synchronized for proper decoding, the above-described prior art scheme provides so-called superframe framing bits in every third "x" position. The superframe framing pattern is chosen as 10001000...; consequently, with each superframe being twelve frames long, the low-speed frame pattern repeats every forty-eight frames and is capable of transmitting eight channels of low-speed data.

In the event of a loss of synchronization, the reframing time (i.e. the time required to re-synchronize all receiver frunctions with the incoming pulse train) is a multiple, determined by the specific reframing method being used, of the longest pattern repetition interval, i.e. forty-eight frames in the above-described prior art system.

It will be noted that in the prior art system, separate synchronization detectors must be provided for the signalling frame pattern (i.e. the 001001... pattern) and the super-frame framing pattern (i.e. the 10001000... pattern).

With the advent of more sophisticated equipment and the consequent need to transmit more and higher-frequency data, it is desirable or even critical to be able to piggy-back more low-speed data channels with a shorter reframing time and simpler equipment onto the D3 pattern.

Summary of the Invention

The present invention makes it possible to transmit $4n-3$ (where n is a positive integer) low-speed data channels in a pattern repetition interval of only 12n frames (e.g. nine channels in thirty-six frames) by preserving only one out of every n 000 sequences in the D3 signalling frame pattern as a framing reference, and setting the remaining signalling frame bits in such a way that no 000 sequence can occur anywhere else in the signalling frame pattern. This concept also makes it possible to use a single synchronization detector for both the signalling information and the low-speed information, as they are both framed by the same reference sequence.

In accordance with a further aspect of the invention, some or all of the low-speed channels can themselves be multiplexed, if desired, to transmit up to $2^{(4n-3)}-1$ separate essentially steady-state signals with a transmission rate of k signals every 12nk frames, where k is the number of multiplexed steady-state signals.

BRIEF DESCRIPTION OF THE DRAWINGS

FIGS. 2a through 2f are pulse diagrams illustrating the time relationship of various signals in the inventive system;

DETAILED DESCRIPTION OF THE INVENTION

Figure 1:
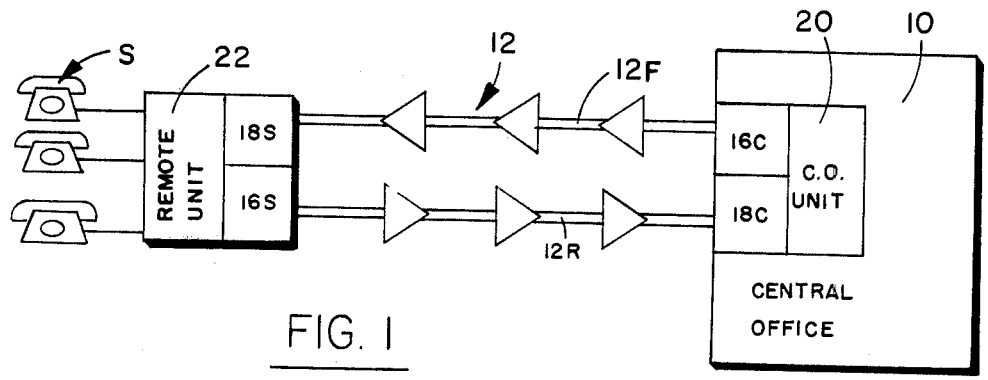
FIG. 1 is an overall block diagram of a system using this invention.

FIG. 1 illustrates a typical telephone system making use of the invention. A central office 10 serves subscribers S, located at some distance from the central office 10, over a repeatered cable 12 having two wire pairs (a forward pair 12F and a return pair 12R) for each twenty-four subscribers, by multiplexing the twenty-four subscriber channels onto what is essentially a T1-type PCM system. The signals used by the subscribers S and by the central office 10 are encoded, at each end of the cable 12, by transmitters 16C and 16S, respectively. At the opposite ends of cable 12, the multiplexed signals are decoded by receivers 18S and 18C, respectively.

In the return direction R (i.e. from the remote unit 22 to the central office unit 20), it is desirable to transmit, in addition to the information coming from subscribers S, certain alarm or status information originated by the remote unit 22 to advise maintenance personnel at the central office 10 of the existence and nature of any malfunction of the remote unit 22 which would not be detectable by a loss of incoming signal at the central office unit 20. In both directions, it is also desirable to transmit certain test signals and other operational data, collectively referred to herein as low-speed information.

The invention accomplishes this by generating, in each of the transmitters 16C and 16S, a T1-type pulse train using a slightly modified version of the standard D3 framing pattern shown in FIG. 2a. In accordance with a preferred embodiment of the invention, the normal 000111000111000111 signalling frame pulse sequence of a thirty-six frame "superframe" is modified to become $0001x_1x_21x_3x_41x_5x_61x_7x_81x_91$, where $x_1$ through $x_9$ are bits representing nine low-speed information channels. Although $x_1$ through $x_9$ can be either "1" or "0" as the low-speed information being transmitted may require, it will be seen that it is impossible for a 000 sequence to occur anywhere except in the first three bits of each superframe.

In a more general form, it will be noted from FIG. 2b, which shows the modified framing pulse pattern of this invention, that each 000111 sequence of the signalling frame bits in a superframe made up of n twelve-frame groups of the standard D3 pattern is replaced by 1xx1xx in the inventive modification, except that the first 000111 sequence in each superframe is replaced by 0001xx, and the last 000111 sequence in each superframe is replaced by 1xx1x1. Thus, the first modified sequence in a superframe contains (4-2) x-bits, the last (4-1) x-bits, and all other 4 x-bits; and consequently, a superframe consisting of n groups of twelve frames contains (n-2)4+(4-2)+(4-1)=(4n-3) x-bits.

Figure 3:
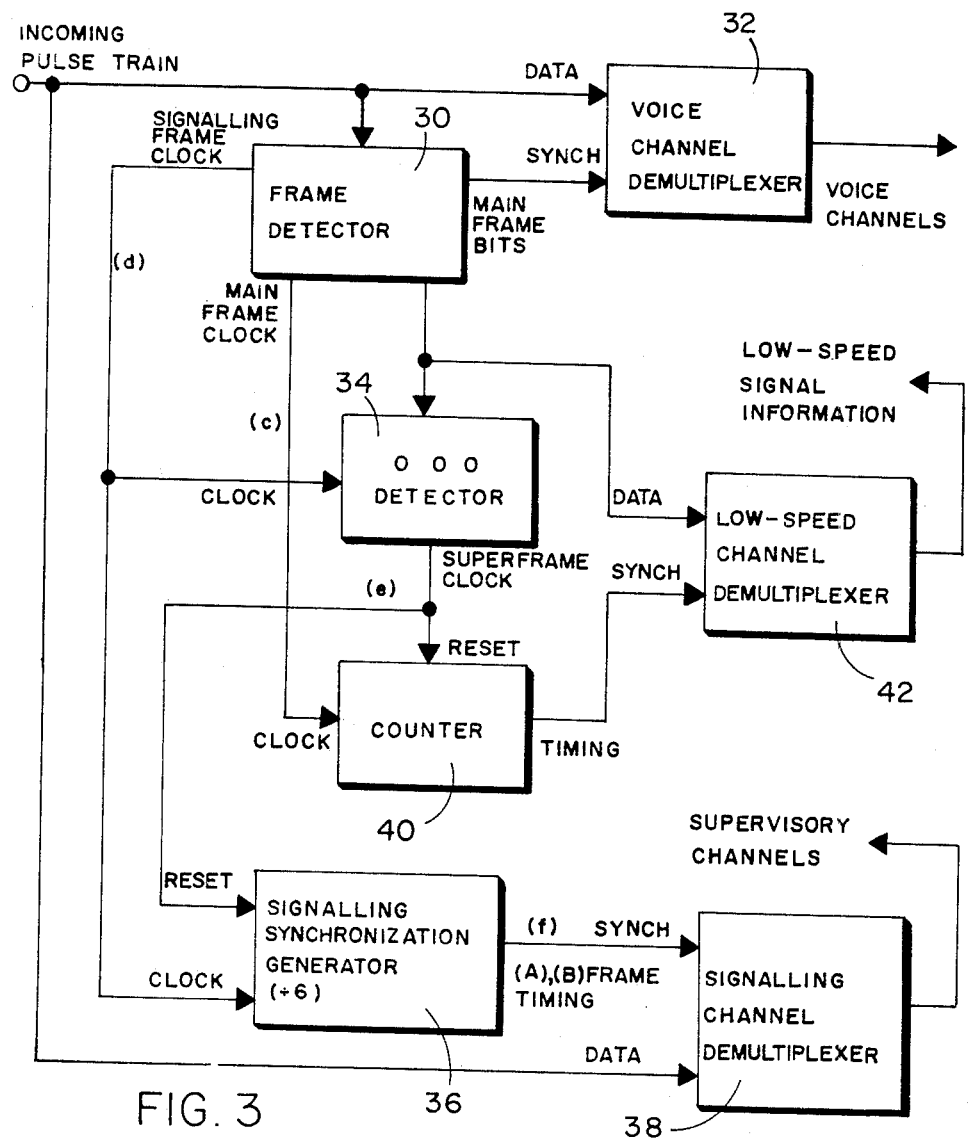
FIG. 3 is a block diagram of receiver circuits involved in the invention.

FIG. 3 shows, in block form, the general manner in which the receivers 18 handle a T1-type pulse train having a modified D3 framing bit pattern. The incoming pulse train is analyzed by a conventional frame detector 30 which extracts the framing information from the pulse train, and which has four outputs: main frame bits (101010 . . . ), signalling frame bits (the modified pattern discussed in detail herein); main frame clock (one pulse every two frames, see FIG. 2c); and signal frame clock (one pulse every two frames, interleaved with the pulses of the main frame clock, see FIG. 2d).

As in any conventional T1-type system, the main frame bits output of the frame detector 30 constitutes the synchronization input of a voice channel demultiplexer 32 whose data input is the incoming pulse train. The signalling frame bits, however, instead of being directly applied to signalling channel demultiplexer 38 to provide its (A), (B) frame timing for synchronization as in a conventional T1-type system, are first applied to a 000 detector 34 which puts out a superframe reference or reset pulse whenever it detects a third consecutive "0" in the signalling frame bit sequence (FIG. 2d).

The reset pulse is used to reset a signalling synchronization generator 36 which is essentially a resettable divide-by-six circuit. Its input is the signalling frame clock (i.e. one pulse every two frames), and its output is one timing pulse every twelve frames. The timing pulses are synchronized by the reset pulse from 000 detector 34 in such manner as to produce the timing information provided, in conventional systems, by the signalling frame bits themselves, i.e. the identification of those frames in the incoming pulse train which contain (B) type signalling information (the frame following the first "0" of each 000 sequence of the standard D3 signalling frame bit pattern) and those which contain (A) type signalling information (the frame following the first "1" of each 111 sequence of the standard D3 signalling frame bit pattern).

The (A), (B) frame timing output of generator 36 provides the synchronization input to the conventional signal channel demultiplexer 38, whose data input is once again the incoming pulse train.

To derive the low-speed signal information, the reset pulse is also fed to a counter 40 which is advanced one count by each main frame clock pulse, and which is reset by the third "0" of the 000 sequence at the start of each superframe by the reset pulse. The output of counter 40 is the timing signal which provides the synchronization input to the low-speed channel demultiplexer 42, whose data input is the signalling frame pulse train from frame detector 30. The low-speed channel demultiplexer operates in a conventional manner to convey the logic levels of the $x_1$ through $x_9$ bits in the signalling frame pulse train to the proper low-speed signal information outputs in accordance with the timing count produced by counter 40.

The signals on lines (c) through (f) of FIG. 3 are illustrated in the time-amplitude diagrams of FIGS. 2c through 2f, respectively.

In accordance with a further aspect of the invention, two or more of the low-speed channels can be multiplexed (at the price of additional reframe time) to allow the transmission of essentially steady-state signals such as alarm indications.

Figure 4:
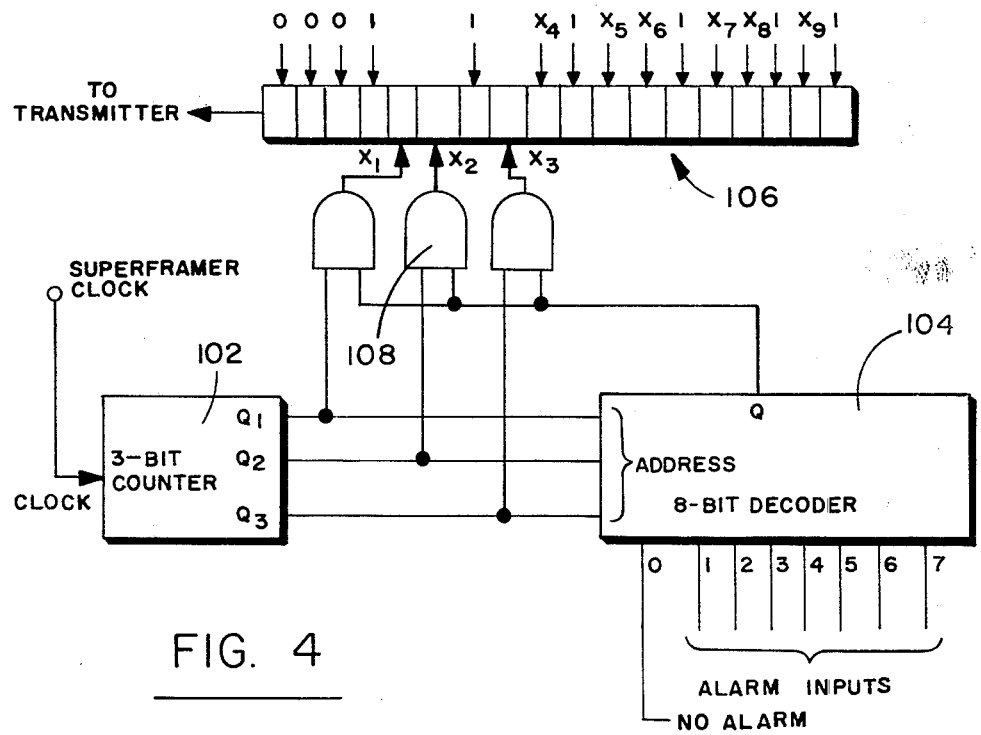
FIG. 4 is a block diagram of an encoding circuit involved in a further aspect of the invention.

As shown in FIG. 4, the low-speed channel multiplexing system of this invention (illustrated in FIG. 4 as a seven steady-state signal device using three of the low-speed channels) includes a three-bit counter 102 which reiteratively generates address codes 0 (binary 000) through 7 (binary 111) at its outputs $Q_1$, $Q_2$, $Q_3$, at the rate of one address code per superframe. The address codes generated by the counter 102 are decoded by an eight-bit decoder 104 which decodes the address code and successively connects its eight inputs (the no-alarm input and the seven alarm inputs) to its Q output.

The signalling frame bit pattern of the transmitted T1-type pulse frame is loaded into a shift register 106. Assuming that the alarm indications are to be multiplexed onto low-speed channels $x_1$, $x_2$, and $x_3$, the $Q_1$, $Q_2$ and $Q_3$ outputs, respectively, of counter 102 are each ANDed with the Q output of decoder 104 and fed to the parallel inputs of shift register 106 corresponding to the $x_1$, $x_2$ and $x_3$ bit positions in the framing pattern. Thus, when no alarm is present, $x_1$, $x_2$ and $x_3$ will all be "0" because at all times either the address is 000 or the Q output is "0" (because alarm inputs 1 through 7 are all "0").

If an alarm condition now occurs at alarm input 2, that input goes to "1". The next time the address generated by counter 102 is binary 010, the decoder 104 connects alarm input 2 to the Q output, and the Q output goes to "1". The resulting coincidence of "1" inputs at AND gate 108 loads a "1" into the $x_2$ position of shift register 106. When the shift register 106 is now serially read out by the transmit circuitry to frame the next superframe, the alarm code 010 will be contained in the $x_1$, $x_2$, $x_3$ channels.

It will be noted that the alarm condition at alarm input 2 is transmitted only once every eight superframes. The presence or absence of the other alarms is transmitted in the intervening superframes.

Figure 5:
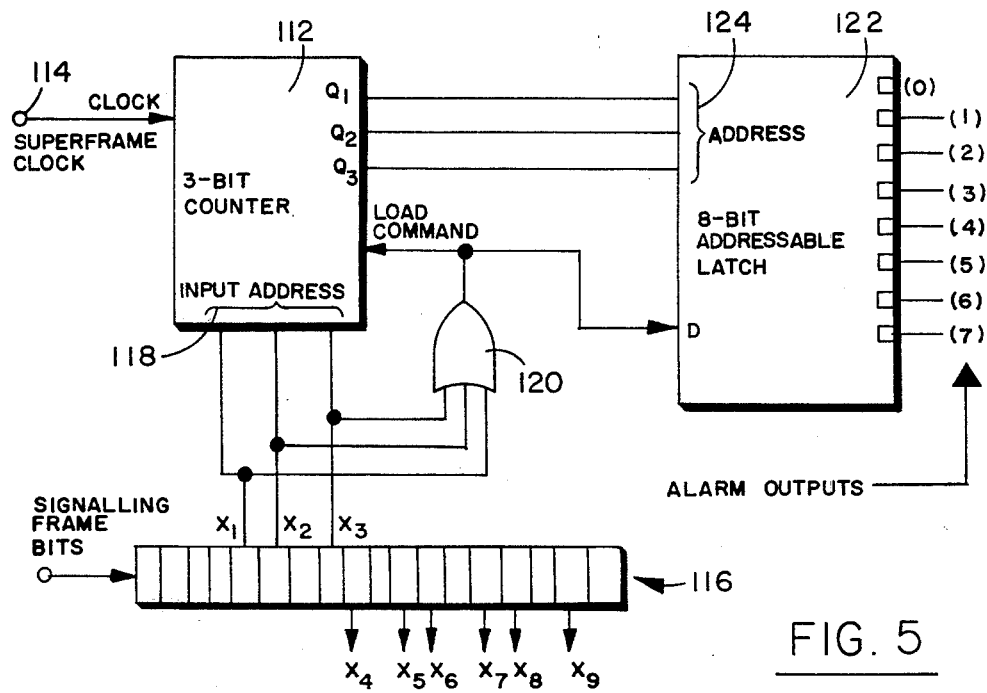
FIG. 5 is a block diagram of a decoding circuit involved in the system of FIG. 4.

FIG. 5 shows the decoding of the multiplexed alarm code at the receivers 18 (FIG. 1). A three-bit counter 112 stepped once per superframe by a superframe clock 114 normally free-runs, i.e. cycles through its eight output stages at the same rate as counter 102 (FIG. 4), but not necessarily in synchronization with it. The incoming signalling frame pulse train is serial-loaded into a shift register 116. When a complete superframe's worth of signalling frame pulses are in the proper position in shift register 116, the $x_1$, $x_2$ and $x_3$ bits are clocked out in parallel and applied to the parallel-load address inputs 118 of counter 112, as well as to the inputs of OR gate 120.

The output of OR gate 120 is applied to the D input of an eight-bit addressable latch 122. The state of the D input is transferred in rotation to the eight alarm outputs (0) through (7) of the latch 122, in accordance with the address appearing at the address inputs 124 of latch 122. While not addressed, the alarm outputs (0) through (7) retain the state in which they were when last addressed.

The output of OR gate 120 is also applied to the load command input of counter 112. Whenever its load command input is "1", counter 112 is reset to put out the address appearing at its parallel-load inputs 118.

As long as there is no alarm condition, i.e. the $x_1$, $x_2$ and $x_3$ bits are all "0", the eight-bit latch 122 simply cycles through its eight outputs and continually resets them all to "0". When an alarm condition such as that at alarm input 2 (FIG. 4) now occurs, one of the next eight superframes will contain a 010 in the $x_1$, $x_2$, $x_3$ positions. At that moment, the resulting "1" output of OR gate 120 causes counter 112 to reset to the address 010 which now appears at the parallel-load inputs 118. This in turn connects the D input of latch 122 to alarm output (2) which immediately latches into the "1" or "on" state.

The counter 112 is now in synchronism with counter 102 and remains that way. If by any chance it should drop out of synchronism, it is resynchronized every time $x_1$, $x_2$, and $x_3$ are not all zero (once every eight superframes in the above example).

When the alarm condition at alarm input 2 (FIG. 4) is corrected, the next 010 address output of counter 102 will produce a 000 in the $x_1$, $x_2$, $x_3$ positions of the pulse train. On the receiving end (FIG. 5), the D input of latch 122 will consequently be "0" while counter 112 provides a 010 address to input 124 of latch 122, and alarm output (2) will latch "off".

In the case of a carrier failure (an all-zero pulse train), all the outputs of latch 122 will latch "off". This is not significant, however, because an all-zero pulse train is one of several conditions which the receiver conventionally recognizes as a system failure. Whenever the receiver recognizes any system failure condition, it conventionally perceives all received data (including any alarm indications) to be invalid, and blocks its utilization.

It will be noted that due to the self-synchronizing nature of the low-speed signal multiplexing arrangement of this invention, the maximum reframe time of K-1 multiplexed alarm signals is k superframes plus the reframe time of the modified D3 pattern itself.

Although the invention has been described herein in terms of a 000 sequence as being the reference point for superframe and signalling frame synchronization, the same result can be achieved in the same manner by using a 111 sequence as a reference, and preventing the occurrence of three successive "1" bits anywhere else in a superframe.

I claim:

1. The method of superimposing low-speed data onto a PCM carrier framing pattern of the D3 type, comprising the steps of:
   (a) substituting, for a superframe consisting of n consecutive aaabbb sequences of the D3 signalling frame bit pattern, a pattern of the form aaabxx . . . bxxbxb, in which a represents a first logic level; b represents another logic level; x represents a logic level which can be either a or b; and . . . represents n-2 sequences of bxxbxx; and
   (b) separately encoding the x bits of said substituted pattern with low-speed information.

2. The method of claim 1, further comprising the steps of:
   (c) transmitting said substituted pattern;
   (d) using the aaa sequence of said transmitted pattern to derive a time reference for decoding both signalling information and low-speed information; and
   (e) decoding said low-speed information with respect to said time reference.

3. The method of claim 1, in which at least three essentially steady-state data signals are multiplexed onto at least two of said x bits by sequentially encoding onto said x bits, in successive superframes, addresses identifying an individual steady-state signal only when said signal is present; transmitting said x bits; decoding said x bits when received to generate an address; and using said decoded address to determine, in successive superframes, both the presence and the identity of each said steady-state signal.

4. A self-synchronizing method of multiplexing a first plurality of essentially steady-state signals onto a second plurality of framing bits having predetermined positions in a superframe of a modified D3-type PCM framing pattern, comprising the steps of:
   (a) sequentially encoding onto said framing bits, in successive superframes, addresses each identifying an individual steady-state signal only when said signal is present;
   (b) transmitting said framing bits;
   (c) decoding said framing bits when received to regenerate said encoded addresses; and
   (d) using, in successive superframes, the address decoded in that superframe to determine both the presence and the identity of one of said steady-state signals.

5. The method of claim 4, in which the absence of a steady-state signal is indicated by transmitting a non-identifying address instead of the address of the steady-state signal involved.

6. Self-synchronizing apparatus for multiplexing a first plurality of essentially steady-state signals onto a second plurality of framing bits having predetermined positions in a superframe of a modified D3-type PCM framing pattern, comprising:
   (a) first addressing means arranged to sequentially address, in successive superframes, each of said steady-state signals;
   (b) encoding means responsive to the presence of the signal being addressed and arranged to encode onto said framing bits an address code identifying said addressed signal if it is present, but a non-identifying address code if it is absent;
   (c) transmitting means arranged to transmit said framing bits;
   (d) receiving means arranged to receive said framing bits and to determine their respective positions in the superframe;
   (e) a plurality of addressable latching means, each corresponding to one of said signals, associated with said receiving means;
   (f) second addressing means arranged to sequentially address, in successive superframes, each of said latching means;
   (g) decoding means associated with said receiving means and arranged to decode said address code;
   (h) address loading means operatively connected to said decoding means and to said second addressing means, and arranged to reset said second addressing means to the decoded address whenever an identifying address code is being decoded;

(i) input means associated with said latching means and operatively connected to said decoding means to set the latching means being addressed into a first condition if the address code being decoded is an identifying code, and into a second condition if the address code being decoded is a non-identifying code.

* * * * *